(12) United States Patent
Nakai et al.

(10) Patent No.: US 6,624,943 B2
(45) Date of Patent: Sep. 23, 2003

(54) DIFFRACTIVE OPTICAL ELEMENT AND OPTICAL SYSTEM HAVING THE SAME

(75) Inventors: Takehiko Nakai, Kawasaki (JP); Michitaka Setani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/898,029

(22) Filed: Jul. 5, 2001

(65) Prior Publication Data

US 2001/0036012 A1 Nov. 1, 2001

Related U.S. Application Data

(63) Continuation of application No. 09/148,156, filed on Sep. 4, 1998, now abandoned.

(30) Foreign Application Priority Data

Sep. 10, 1997 (JP) .............................. 9-262833

(51) Int. Cl.[7] .................................. G02B 5/18
(52) U.S. Cl. ................... 359/569; 359/566; 359/570; 359/571; 359/573; 359/574; 359/575; 359/576
(58) Field of Search ................... 359/569, 570, 359/571, 573, 574, 575, 576, 587

(56) References Cited

U.S. PATENT DOCUMENTS

| | | | |
|---|---|---|---|
| 4,245,882 A | 1/1981 | Chang | 350/3.72 |
| 5,044,706 A | 9/1991 | Chen | 359/357 |
| 5,048,925 A | 9/1991 | Gerritsen et al. | 359/569 |
| 5,446,588 A | 8/1995 | Missig et al. | 359/565 |
| 5,589,983 A | 12/1996 | Meyers et al. | 359/566 |
| 5,847,877 A | * 12/1998 | Imamura et al. | 359/566 |
| 6,122,104 A | 9/2000 | Nakai | 359/576 |
| 6,157,488 A | * 12/2000 | Ishii | 359/569 |
| 6,262,846 B1 | 7/2001 | Nakai | 359/576 |

FOREIGN PATENT DOCUMENTS

| | | |
|---|---|---|
| DE | 195 33 591 | 3/1996 |
| EP | 0 752 599 | 1/1997 |
| JP | 4-213421 | 8/1992 |
| JP | 6-324262 | 11/1994 |
| JP | 9-127321 | 5/1997 |
| JP | 9-127322 | 5/1997 |
| WO | WO 96/00912 | 1/1996 |

OTHER PUBLICATIONS

S.M. Ebstein, "Achromatic Diffractive Optical Elements," Proceedings of the SPIE: Diffractive and Holographic Optics Technology II, vol. 2404 (Feb. 9 and 10, 1995), pp. 211–216.

M.W. Farn, et al., "Diffractive Doublet Corrected On–Axis at Two Wavelengths," Proceedings of the SPIE: International Lens Design Conference, vol. 1354, (Jun. 11–14, 1990), pp. 24–29.

C. Londoño, et al., "The Design of Achromatized Hybrid Diffractive Lens Systems," Proceedings of the SPIE: International Lens Design Conference, vol. 1354, (Jun. 11–14, 1990), pp. 30–37.

Saleh and Teich, Fundamentals of Optics, Wiley, pp. 179–177.

Y. Arieli, et al., "Design of a Diffractive Optical Element for Wide Spectral Bandwidth," Optics Letters, vol. 23, No. 11, (Jun. 1, 1998), pp. 823–824.

* cited by examiner

*Primary Examiner*—John Juba
*Assistant Examiner*—Leo Boutsikaris
(74) *Attorney, Agent, or Firm*—Fitzpatrick, Cella, Harper & Scinto

(57) ABSTRACT

A diffractive optical element includes a plurality of laminated diffraction grating surfaces. Each of the diffraction grating surfaces is formed to have a sufficiently small grating thickness as compared with a grating pitch thereof.

58 Claims, 12 Drawing Sheets

DIFFRACTIVE OPTICAL ELEMENT AND OPTICAL SYSTEM HAVING THE SAME

This application is a continuation of application Ser. No. 09/148,156 filed Sep. 4, 1998 now abandoned.

BACKGROUND OF THE INVENTION

1. Field of the Invention

The present invention relates to diffractive optical elements, and more particularly to a diffractive optical element having such a grating structure that rays of light of a plurality of wavelengths or a specific wavelength concentrate onto diffraction light of a specific order (design order) of diffraction, and to an optical system having the diffractive optical element.

2. Description of Related Art

Heretofore, there have been known various methods of correcting chromatic aberration in an optical system. According to one of the known methods, two glass (lens) materials which differ in dispersion are combined with each other to be used for abating chromatic aberration.

According to another known method, chromatic aberration is abated by using a diffractive optical element having a diffracting function for an optical system which includes a refracting lens, as disclosed, for example, in the optical literature such as SPIE Vol. 1354 "International Lens Design Conference (1990)" and also in the specifications of Japanese Laid-Open Patent Applications No. HEI 4-213421 and No. HEI 6-324262 and U.S. Pat. No. 5,044,706.

This method has been developed by utilizing a physical phenomenon that the direction in which chromatic aberration arises in a ray of light of a certain wavelength with respect to a ray of light of a reference wavelength on a refractive surface becomes reverse to that on a diffractive surface.

Further, such a diffractive optical element can be provided with an effect of serving as an aspheric lens by varying the period of a periodic structure of its diffraction grating, so that aberrations can be abated advantageously.

Comparing refractive and diffractive surfaces in respect of a refracting action of rays of light, one ray of light remains one ray after refraction on a lens surface, whereas one ray of light is splint into rays of different orders when it is diffracted by a diffraction grating.

Therefore, in using a diffractive optical element for a lens system, it is necessary to design the grating structure in such a manner that light fluxes of a useful wavelength region concentrate onto diffraction light of a specific order (design order) of diffraction. With light fluxes concentrating onto diffraction light of the design order, in order to lower the luminous intensity of diffraction light of orders other than the design order, it becomes necessary that the diffraction efficiency of diffraction light of the design order is sufficiently high. Further, if there are some rays of light of diffraction orders other than the design order, these rays become flare light, because they are imaged in a place different from the imaging place of the rays of the design order.

For an optical system having a diffractive optical element, therefore, it is important to pay sufficient heed to the spectral distribution of the diffraction efficiency of diffraction light of the design order and also to the behavior of diffraction light of orders other than the design order.

FIG. 11 shows a case where a diffractive optical element 1 having one diffraction grating 4 formed on a base plate 2 is formed on a certain surface in an optical system. In this case, the diffraction efficiency for diffraction light of a specific order of diffraction is obtained as shown in FIG. 12, which shows in a graph the characteristic of the diffraction efficiency. In FIG. 12, the abscissa axis of the graph indicates wavelength and the ordinate axis indicates diffraction efficiency. The diffractive optical element 1 is designed to have the highest diffraction efficiency at the first order of diffraction (shown in a full line curve in FIG. 12) in the useful wavelength region.

In other words, the design diffraction order of this diffractive optical element is the first order. The graph of FIG. 12 also shows the diffraction efficiency of diffraction light obtained at diffraction orders near the design order, i.e., a zero order and a second order (1±1).

As shown in FIG. 12, the diffraction efficiency at the design order becomes highest at a certain wavelength (540 nm) (hereinafter referred to as the design wavelength) and gradually lowers at other wavelengths. Such a lowering portion of the diffraction efficiency obtained at the design order becomes diffraction light of other orders, thereby appearing as flare light. Further, in a case where a plurality of diffractive optical elements are used, a drop in diffraction efficiency at wavelengths other than the design wavelength eventually causes a decrease in transmission factor.

The arrangement of lessening such a drop in diffraction efficiency is disclosed in Japanese Laid-Open Patent Applications No. HEI 9-127321, No. HEI 9-127322, etc. The diffractive optical element disclosed in Japanese Laid-Open Patent Application No. HEI 9-127321 is in a sectional shape formed by laminating two layers 4 and 5, as shown in FIG. 13.

The diffractive optical element disclosed in Japanese Laid-Open Patent Application No. HEI 9-127322 is of such a grating structure that three layers 4, 5 and 6 are laminated as shown in FIG. 14. As shown in FIG. 14, the layer 5, which is sandwiched between two diffraction grating surfaces 8 and 9 provided at the boundaries of the layers 4, 5 and 6, has a thickness which varies with portions thereof. In this diffractive optical element, each of the diffraction grating surfaces 8 and 9 is formed between two different materials. A high diffraction efficiency is attained by optimizing a difference in refractive power between the layer materials located in front and in rear of the boundary and the depth of the grating grooves.

Since the arrangements of the above-mentioned diffractive optical elements necessitate a wavelength characteristic of the difference in refractive power between the materials in front and in rear of each of grating areas to have desired values, it is impossible to have a larger difference in refractive power than in a case where a grating area has air on one side thereof instead of a layer material. As a result, their gratings must be arranged to have a relatively large grating thickness. In the case of the diffractive optical element disclosed in Japanese Laid-Open Patent Application No. HEI 9-127321, for example, the grating thickness is 10 $\mu$m or thereabout.

In the case of the diffractive optical element disclosed in Japanese Laid-Open Patent Application No. HEI 9-127322, the number of layers of three different materials is increased to three and the number of gratings is increased to two. One of the two gratings measures at least 7 $\mu$m in thickness, so that a considerably deep grating shape would be recognized.

In manufacturing diffractive optical elements, the above-stated grating shapes can be formed by cutting. A product thus obtained by cutting either may be used directly as a diffractive optical element or may be used as a mold for duplicating diffractive optical elements.

It is conceivable as a simplified manufacturing method to form an arcuate diffraction grating surface with a cutting tool edge 17 by rotating a base plate 2 as shown in FIG. 15. In this method, while the cutting tool edge 17 is moved in the direction of a grating pitch, the cutting process is carried out by varying a distance between the base plate 2 and the cutting tool edge 17 to obtain a desired shape of grating.

According to this manufacturing method, if the grating thickness is large as mentioned above, the amount of cutting by the cutting process increases to cause the cutting tool edge to be greatly abraded. As a result, the shape of the tool edge obtained at the commencement of cutting differs from its shape obtained at the end of cutting. Such abrasion causes the grating thickness at the point where the cutting comes to an end to become thinner than a desired value. In addition to this problem, since the cutting tool edge is rounded by the abrasion, the grating shape comes to deviate from a desired saw-tooth like shape.

Besides, since the grating thickness is thick with respect to the grating pitch, the slanting plane of grating slants steeper than the one-layer type conventional diffractive optical element. Therefore, the fore end of the cutting tool edge must be formed at a sharper angle than the slanting plane of grating. This necessitates use of a cutting tool edge at a sharper angle than a cutting tool edge for the one-layer type conventional diffractive optical element. The sharper angle of the cutting tool edge then causes the cutting tool edge to be more readily abraded.

The abrasion of the cutting tool edge may be abated by arranging its fore end part to have a duller angle. However, the duller tool edge angle necessitates the slanting plane of the saw-tooth-shaped (or serrated) grating to have a duller angle for preventing it from interfering with the cutting tool edge. The adoption of the laminated structure causes the grating thickness to be thicker and to have a steeper slanting plane than the grating of an ordinary one-layer type diffractive optical element. However, an attempt to moderate the angle of the slanting plane of the laminated structure causes a great increase in grating pitch. The usable range of such a diffractive optical element, therefore, would be limited by the increase in grating pitch.

BRIEF SUMMARY OF THE INVENTION

It is an object of the invention to provide a diffractive optical element, or an optical system having the diffractive optical element, which is arranged to excel in workability of the diffractive optical element or in workability of a mold to be used for mass production of the diffractive optical element.

To attain the above object, in accordance with a mode of the invention, there is provided a diffractive optical element, which comprises a plurality of laminated diffraction grating surfaces, wherein each of the diffraction grating surfaces is formed to have a sufficiently small grating thickness as compared with a grating pitch thereof.

In accordance with another mode of the invention, there is provided a diffractive optical element, which comprises a plurality of laminated diffraction grating surfaces, wherein letting a grating pitch and a grating thickness of each of the diffraction grating surfaces be denoted by P and d, respectively, the following condition is satisfied:

$d/P < 1/6.$

In accordance with a further mode of the invention, there is provided a diffractive optical element, which comprises a plurality of laminated diffraction grating surfaces, wherein letting a grating thickness of each of the diffraction grating surfaces be denoted by d ($\mu$m), the following condition is satisfied:

$1 < d < 6.$

In accordance with a still further mode of the invention, there is provided a diffractive optical element, which comprises a plurality of laminated diffraction grating surfaces, wherein letting a grating pitch and a grating thickness of each of the diffraction grating surfaces be denoted by P ($\mu$m) and d ($\mu$m), respectively, the following conditions are satisfied:

$d/P < 1/6$ $1 < d < 6.$

In accordance with the best mode of the invention, the diffraction grating surfaces are formed respectively with materials which differ from each other in dispersion, each of the diffraction grating surfaces is in a blazed shape with respect to a section of the grating pitch thereof, a useful wavelength region is an entire visible spectrum, and a diffraction efficiency of diffraction light of a specific order other than a zero order is high over the entire visible spectrum, including nearly 100%.

In accordance with a further mode of the invention, slant directions of gratings of the plurality of diffraction grating surfaces of the blazed shape are identical, and in accordance with a still further mode of the invention, a slant direction of a grating of at least one of the diffraction grating surfaces is opposite to that of the other diffraction grating surfaces.

In accordance with a further mode of the invention, the diffractive optical element functions as a lens.

According to the invention, optical systems of varied kinds, such as a photo-taking optical system and an observation optical system, can be arranged to include the above-stated diffractive optical elements which can be manufactured without difficulty.

The above and other objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Figure 1:
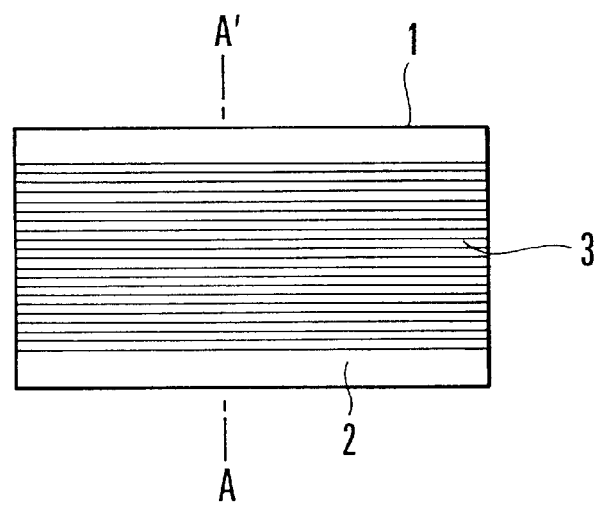
FIG. 1 is a front view showing essential parts of a diffractive optical element according to a first embodiment of the invention.

FIG. 1 is a front view of a diffractive optical element according to a first embodiment of the invention. The diffractive optical element 1 shown in FIG. 1 includes a base plate 2 and a lamination part (diffraction grating part) 3 which is formed on the surface of the base plate 2 and which is composed of a plurality of layers (diffraction gratings) 4, 5, 6 and 7 shown in FIG. 2.

Figure 2:
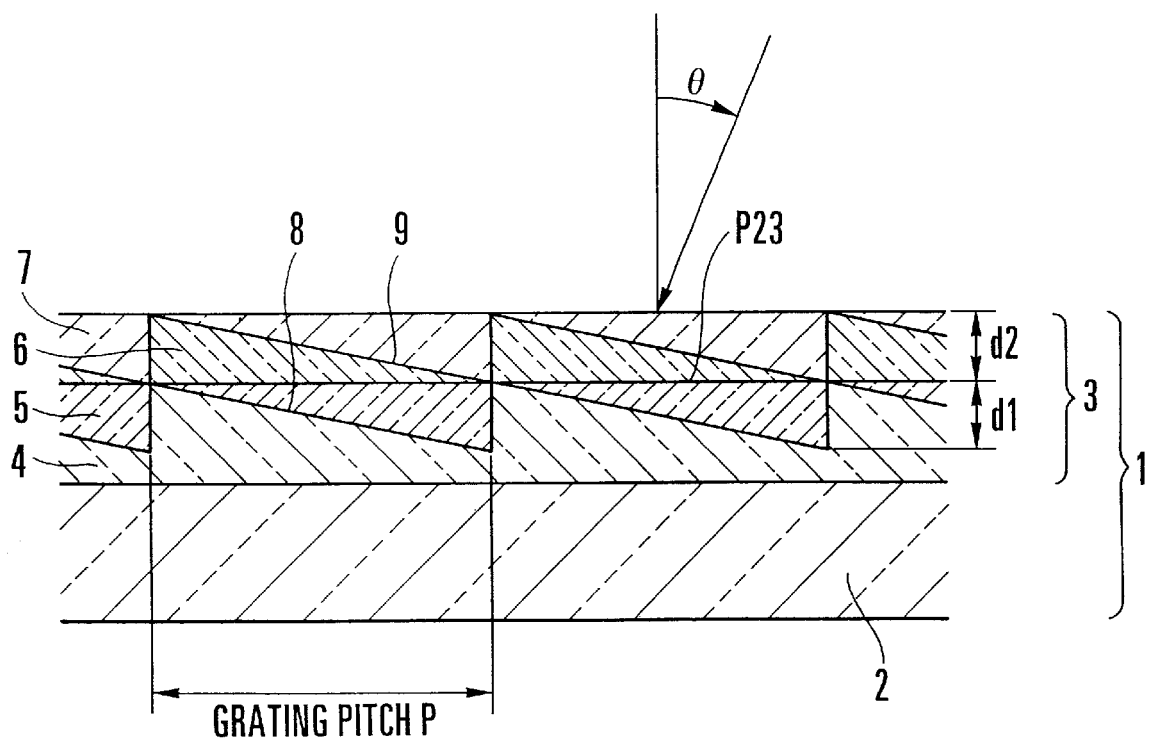
FIG. 2 is a sectional view showing essential parts of the diffractive optical element according to the first embodiment of the invention.

FIG. 2 is a sectional view of the diffractive optical element 1 taken along a line A–A' shown in FIG. 1. In FIG. 2, the diffractive optical element 1 is shown in an exaggerated shape in the direction of depth of diffraction grating surfaces 4 and 8.

As shown in FIGS. 1 and 2, the diffractive optical element 1 is formed by laminating, on the base plate 2, a total of four layers, i.e., the first layer 4, the second layer 5, the third layer 6 and the fourth layer 7. The first diffraction grating surface 8 is formed between the first layer 4 and the second layer 5. The second diffraction grating surface 9 is formed between the third layer 6 and the fourth layer 7.

A boundary part P23 between the second layer 5 and the third layer 6 is formed to be a flat part having no grating. The first layer 4 and the third layer 6 are made of the same material. The second layer 5 and the fourth layer 7 are made of the same material. Then, all the layers 4, 5, 6 and 7 are combined to act as one diffractive optical element 1.

In the case of the first embodiment, each layer (4, 5, 6 or 7) which has a diffraction grating surface formed on one side and periodically changes the thickness of its layer material in a cycle of a length P (hereinafter referred to as the grating pitch) is called a diffraction grating.

Each of the diffraction gratings in the first embodiment is arranged to be a blazed-type diffraction grating, which is obtained by approximating the so-called kinoform with a triangular wave.

Further, a difference in height between the crest and trough of the diffraction grating surface is herein called the grating thickness d of the diffraction grating surface.

In the case of the first embodiment, the diffractive optical element is arranged to be in a grating structure in which at least three diffraction gratings, i.e., at least two diffraction grating surfaces, made of at least two materials which differ from each other in dispersion (Abbe number vd) are laminated on the base plate 2, to have a high diffraction efficiency at a specific (design) diffraction order within a useful wavelength region (visible spectrum), and to make the grating thickness d of each diffraction grating surface sufficiently small as compared with the grating pitch P thereof. For example, the following condition is satisfied:

$d/P < 1/6$

Further, with numerical values concretely presented, the following condition is satisfied:

$1 \mu m < d < 6 \mu m$.

In the case of FIG. 2, the slant directions of the diffraction grating surfaces of a plurality of diffraction gratings are identical.

A structural arrangement resembling the shape of the diffractive optical element of the invention is disclosed in Japanese Laid-Open Patent Application No. HEI 9-127321. However, the diffractive optical element disclosed in this publication is intended to have a certain target diffractive power shared by a plurality of diffraction gratings. For that purpose, each of the diffraction gratings must individually have a diffraction characteristic. The diffractive optical element thus differs in grating pitch, grating thickness and material from the diffractive optical element of the invention in which the diffraction gratings 4 to 7 are arranged to act jointly as one diffraction grating.

The diffraction efficiency of the diffractive optical element according to the first embodiment of the invention is next described as follows.

Figure 13:
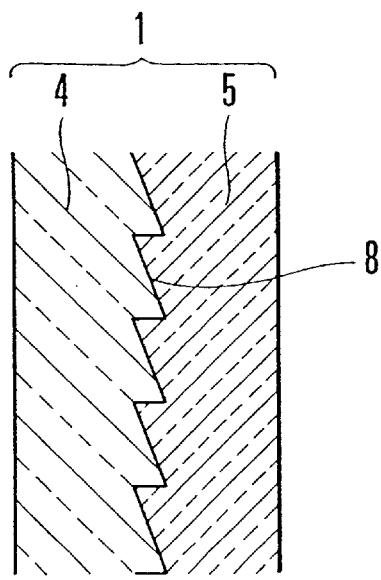
FIG. 13 shows the grating shape of the conventional diffractive optical element.
Figure 14:
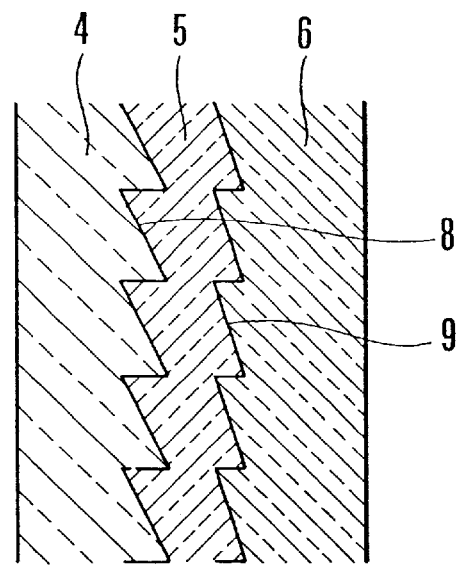
FIG. 14 shows the grating shape of another conventional diffractive optical element.
Figure 15:
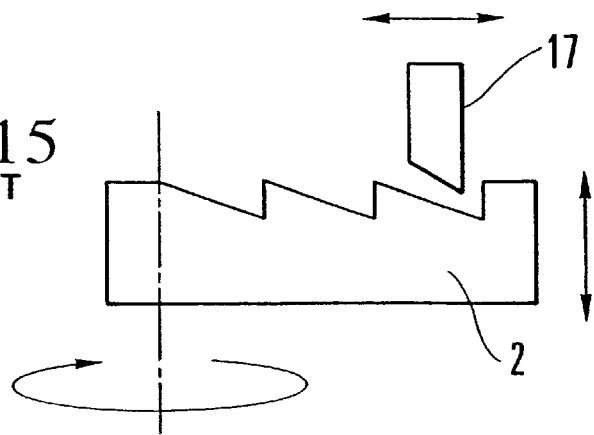
FIG. 15 shows the method of manufacturing the conventional diffractive optical element.

In the case of a transmission-type diffractive optical element 1 having a diffraction grating surface 8 at a boundary between two layers 4 and 5 as shown in FIG. 13, in order to obtain a maximum diffraction efficiency for a design wavelength λ0, a difference d0 in height between the crest and trough of the diffraction grating surface 8, i.e., a difference in optical path length (hereinafter referred to as the optical path length difference of a diffraction grating surface), must be integer times as much as the design wavelength λ0, when a light flux is made perpendicularly incident on the diffractive optical element. This condition can be expressed as follows:

$$d0 = (n01 - n02)d = m\lambda 0 \quad (1)$$

where "n01" represents the refractive index of the material of the layer 4 for the design wavelength λ0, "n02" represents the refractive index of the material of the other layer 5 for the design wavelength λ0, "d" represents the grating thickness of the diffraction grating 4 or 5, and "m" represents a design order of diffraction.

Figure 11:
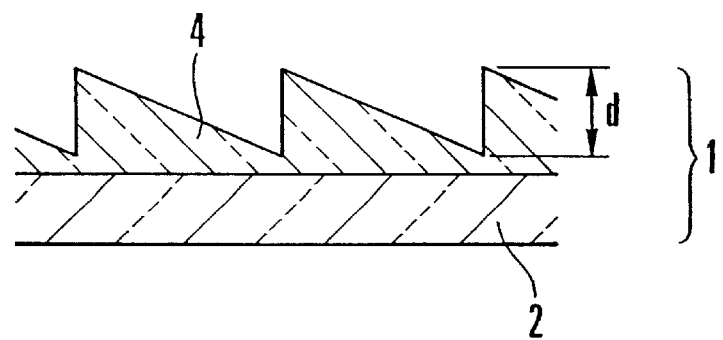
FIG. 11 is a sectional view showing essential parts of a conventional diffractive optical element.
Figure 12:
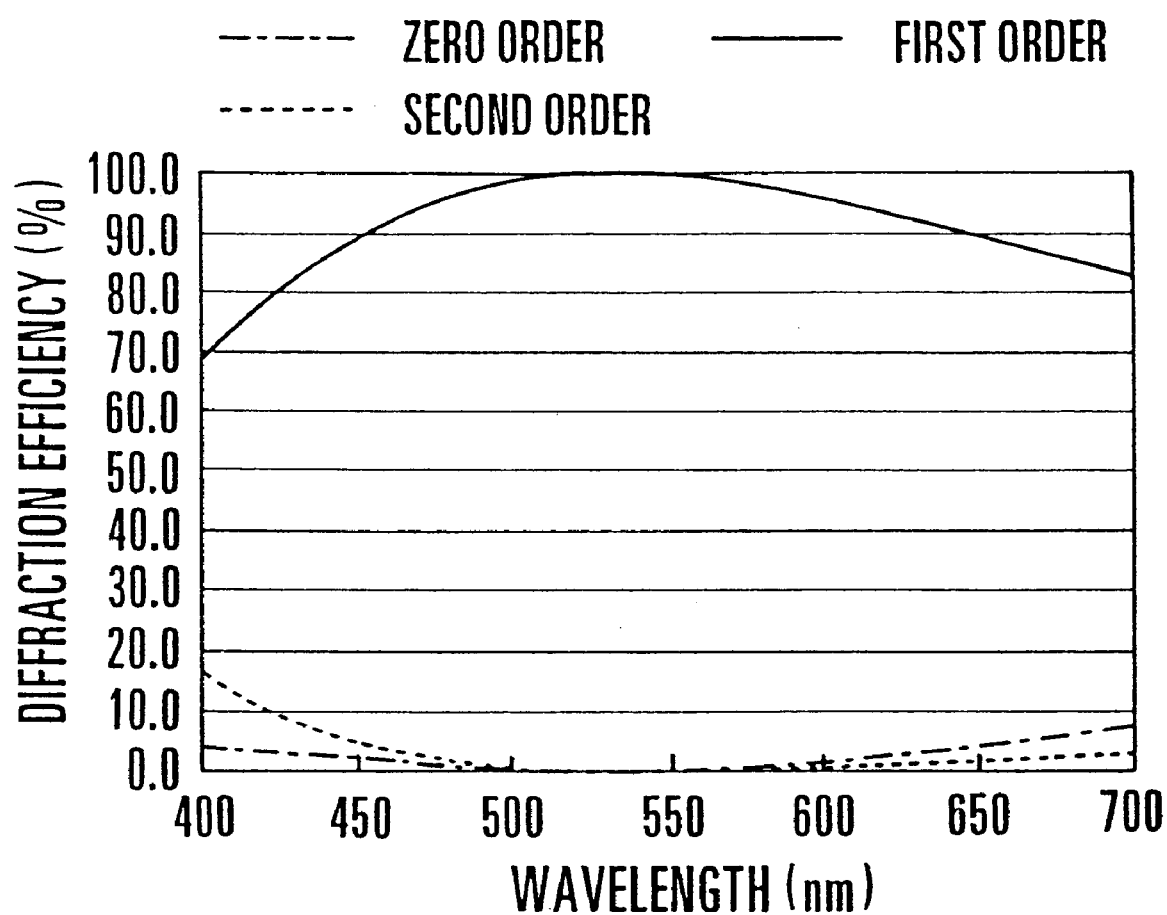
FIG. 12 shows the diffraction efficiency of the conventional diffractive optical element.

In a case where the layer 5 is air (n02=1), the diffractive optical element corresponds to the diffractive optical element 1 shown in FIG. 11 composed of one layer.

A diffractive optical element having a structure composed of two or more layers, i.e., having two or more diffraction gratings, is arranged basically on the same concept. In order to have all the layers act as one diffraction grating, the diffractive optical element must be configured such that a sum value obtained by adding together all values of optical path length difference between the crest and trough of diffraction grating surfaces formed at boundaries between the layers becomes integer times as much as the design wavelength. Therefore, in the case of the first embodiment shown in FIG. 2, the conditional expression becomes as follows:

$$(n01-n02)d1+(n01-n02)d2=m\lambda 0 \quad (2)$$

$$(n01-n02)(d1+d2)=m\lambda 0$$

where "n01" represents the refractive index of the material of the first and third layers 4 and 6 for the design wavelength λ0, "n02" represents the refractive index of the material of the second and fourth layers 5 and 7 for the design wavelength λ0, and "d1" and "d2" represent the grating thicknesses of the first (second) diffraction grating and the third (fourth) diffraction grating, respectively.

It is apparent from the above-stated condition that, even if a diffraction grating having a specific grating thickness in the diffractive optical element 1 is divided into a plurality of diffraction gratings (4, 5 and 6, 7) of arbitrary grating thickness, as long as the the materials forming the diffraction grating surface are the same materials (4, 6 and 5, 7), the diffraction efficiency is not affected by the division if a light flux is made perpendicularly incident on the diffractive optical element 1.

In the case of a diffractive optical element of the conventional laminated structure, machining work on the diffractive optical element is difficult as it is difficult to obtain a sufficient difference in refractive index between materials forming a boundary. According to the diffractive optical element of the invention, on the other hand, a diffraction grating is divided into a plurality of diffraction gratings of thin grating thicknesses which can be easily machined, and the thus-obtained diffraction gratings are laminated.

The difference between the arrangement of the invention and the conventional arrangement is described through comparison of concrete examples of diffractive optical elements as follows. A conventional two-layer structure shown in FIG. 13 is first described by way of example as follows. Here, in the conventional two-layer structure, an optical glass material, LaFK 60 (nd=1.63246 and vd=63.8) manufactured by Sumita Optical Glass Co., is used for the fist layer, and a plastic material PC (nd=1.5831 and vd=30.2) is used for the second layer.

In this conventional arrangement example, the grating thickness of the first diffraction grating 4 is 11.9 μm. In manufacturing a diffractive lens with this diffractive optical element of the laminated structure, a minimum pitch necessary for the lens is assumed, for example, to be 40 μm. Then, the angle of the slanting plane of the diffraction grating surface becomes 16.6° at the minimum pitch. If the diffraction grating is to be formed by the above-stated cutting process, the edge angle of the cutting tool edge must be arranged to be not exceeding 73.4°.

The arrangement according to the invention is next described as follows. The grating structure of the diffractive optical element is assumed to be as shown in FIG. 2. The same materials mentioned above are assumed to be used for forming the diffraction gratings. The first layer 4 and the third layer 6 are, therefore, made of the optical glass LaFK 60 (nd=1.63246 and vd=63.8) manufactured by Sumita Optical Glass Co., and the second layer 5 and the fourth layer 7 are made of the plastic material PC (nd=1.5831 and vd=30.2). The grating thickness d1 of the first (second) diffraction grating and the grating thickness d2 of the third (fourth) diffraction grating are both 5.95 μm.

The grating thicknesses d1 and d2 may be of any values as long as a sum of them becomes the above-stated value of 11.9 μm. However, they are preferably arranged to be equal to each other, because such arrangement permits use of one mold in common for both of them in the case of forming the diffraction gratings by molding and one tool edge in common for both of them if the diffraction gratings are to be formed by cutting, instead of molding.

Figure 3:
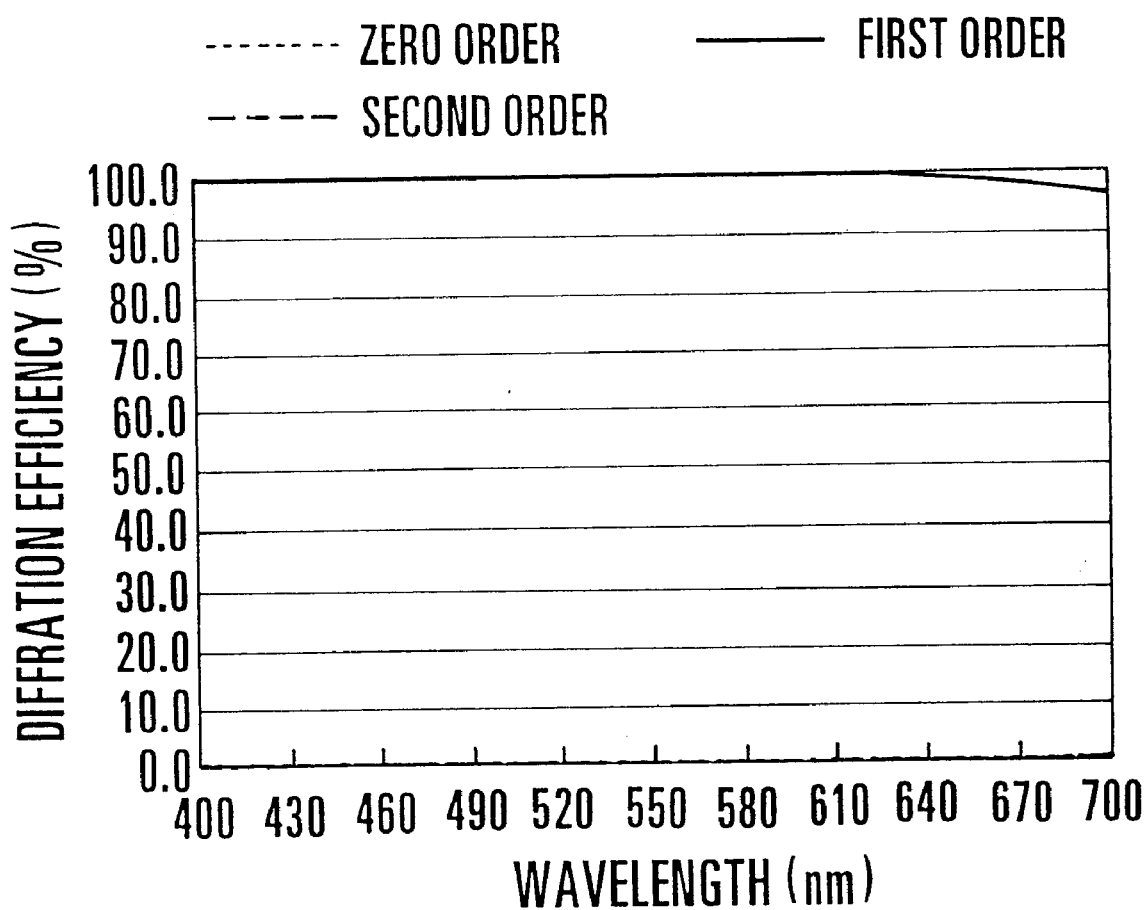
FIG. 3 is a graph showing the diffraction efficiency of the diffractive optical element according to the first embodiment of the invention.

FIG. 3 shows the diffraction efficiency of the structure of the first embodiment obtained for the useful wavelength region. As shown in FIG. 3, the first embodiment has a high diffraction efficiency at the design order of diffraction in the same manner as the conventional arrangement.

Next, it is here assumed that a diffractive lens is manufactured with the diffractive optical element of the invention which has a minimum pitch P of 40 μm. In this case, the angle of the slanting plane of the diffraction grating surfaces becomes 8.5° at the minimum pitch P. In manufacturing the diffraction gratings by the above-stated cutting process, the edge angle of the cutting tool edge can be arranged to be not exceeding 81.5°.

As described above, the edge angle of the cutting tool edge can be duller than in the case of the conventional arrangement. Further, since the grating thickness of each diffraction grating is only half of that of the conventional arrangement, the amount of cutting the diffraction grating surface is only half of that of the conventional arrangement. By virtue of these two advantageous points, the abrasion of the cutting tool edge is reduced to a great extent, so that the diffractive optical element can be easily manufactured to have uniform grating thickness over the whole area thereof.

The edge angle of the cutting tool edge is preferably a dull angle measuring at least 80°. With the grating thickness of the diffraction grating assumed to be "d" and the minimum grating pitch of the diffraction grating assumed to be "P", the grating thickness of each of the diffraction gratings is preferably determined to satisfy the condition of d/P≦1/6. It is also possible to lessen the abrasion of the cutting tool edge by combining thin diffraction gratings which measure only 6 μm or less in grating thickness to lessen the cutting amount.

Since the diffraction grating of the conventional arrangement example measured about 12 μm in grating thickness, the diffractive optical element of the invention gives a better workability by dividing the diffraction grating into two. Further, in a case where a combination of materials causes a further increase in grating thickness, the improved workability can be retained by dividing the diffraction grating not only into two but into a greater number of parts such as three or four parts and then by laminating these divided diffraction gratings.

While the arrangement of the first embodiment described above is applied to the diffraction grating of the type disclosed in Japanese Laid-Open Patent Application No. HEI 9-127321, it applies also to the diffractive optical element of another type disclosed in Japanese Laid-Open Patent Application No. HEI 9-127322 which is of a laminated structure having different grating thicknesses. In that case, the above-stated arrangement of the invention whereby a plurality of thin diffraction gratings are combined with each other is applied to one of the two diffraction gratings having a thicker grating thickness than the other.

Figure 4:
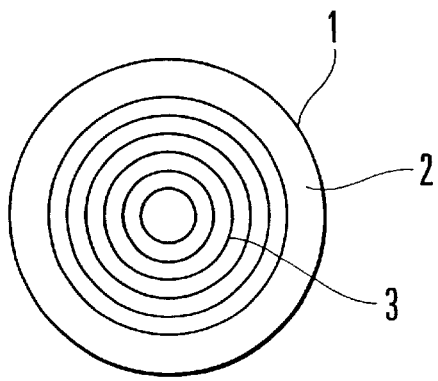
FIG. 4 shows a diffractive lens related to the invention.

The diffraction grating shape has been described by limiting it to a shape obtained within one period of diffraction grating. However, it is known that the diffraction efficiency is basically not affected by the pitch of diffraction grating. In other words, the above-stated arrangement of the first embodiment is applicable not only to the one-dimensional diffraction grating shown in FIG. 1 but also to diffractive optical elements of any different grating shapes, such as a diffractive lens shown in FIG. 4.

The first embodiment described above is a diffractive optical element having a diffraction grating arranged on a flat plate. However, the same advantageous effect can be attained by arranging the diffraction grating on a curved lens surface.

Further, in the foregoing, the first embodiment has been described for a case where the design diffraction order is the first order. It is, however, not limited to the first order. With a design diffraction order arranged to be other than the first order, such as the second order, the same advantageous effect is attainable by setting a composite optical path length difference to become a desired design wavelength at the desired diffraction order. Further, one and the same material may be used both for the base plate 2 and the first diffraction grating 4.

Another reason for setting the grating thickness d and the grating pitch P to be "d/P<1/6" according to the invention is next described as follows.

Figure 7A:
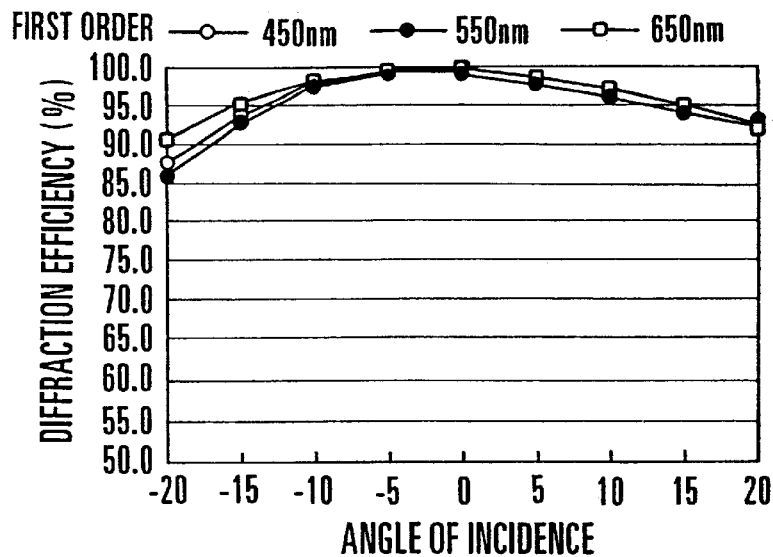
FIGS. 7A to 7C are graphs showing the incident-angle characteristic of the diffractive optical element according to the first embodiment of the invention.
Figure 7B:
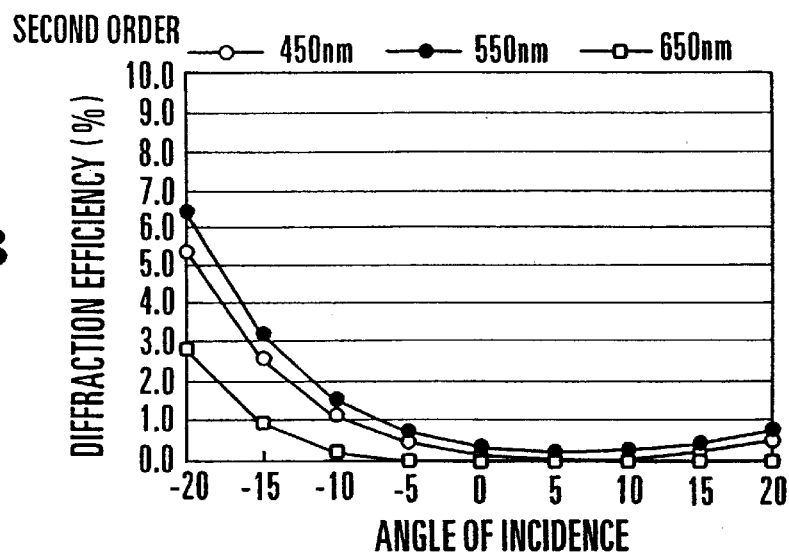
Figure 7C:
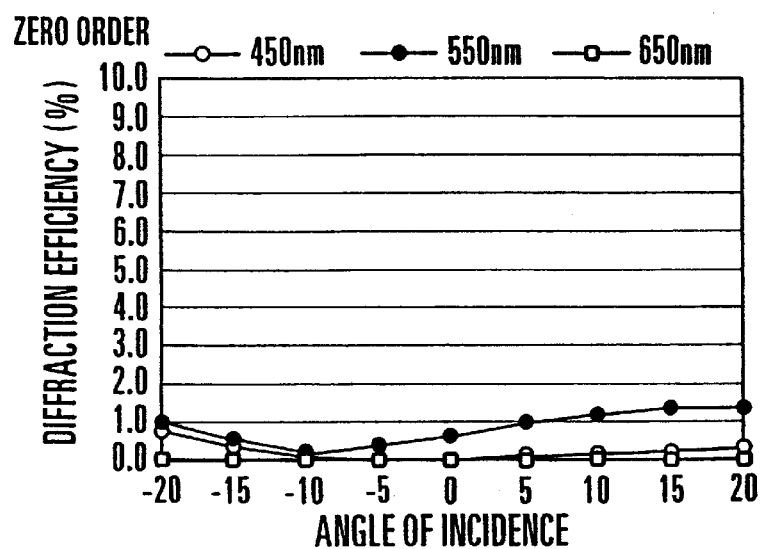

The numerical value range of the value d/P shown above is important also in respect of dependency of the diffraction efficiency on the incident angle of light wave incident on the diffraction grating as described later herein. FIGS. 7A, 7B and 7C show the incident-angle dependency of the diffraction efficiency in a case where the first embodiment is arranged to have a grating pitch P at 59.5 μm with the grating thicknesses d1 and d2 set at 5.95 μm. As apparent from FIG. 7B, in respect of the incident-angle dependency of the diffraction efficiency for the second-order diffraction light, the diffraction efficiency has large values at incident angles of θ<−15° and above for wavelengths 550 nm and 450 nm. Therefore, for general use, the diffraction efficiency is restricted by incident angles (a parasitic diffraction light component is to be suppressed within 3%). In this instance, the value of d/P is 1/10.

Figure 16A:
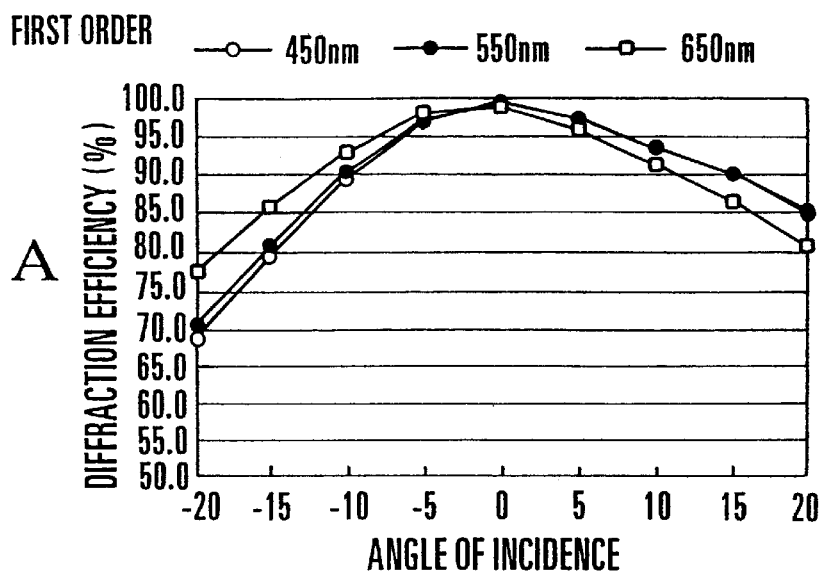
FIGS. 16A to 16C show the diffraction efficiency of a diffractive optical element (different from that of FIGS. 7A through 7C) according to the first embodiment of the invention.
Figure 16B:
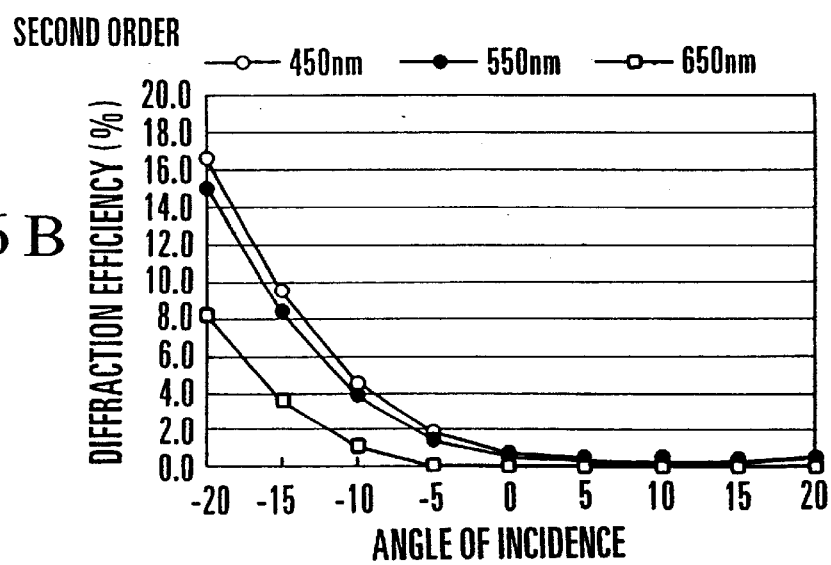
Figure 16C:
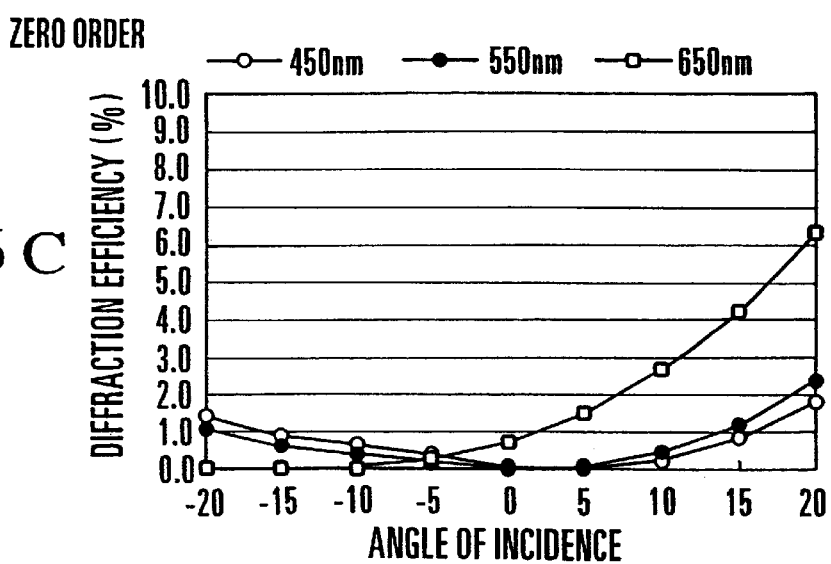

FIGS. 16A, 16B and 16C show the incident-angle dependency of the diffraction efficiency obtained by the structural arrangement of the first embodiment with a material called LAL12 (nd=1.67790 and vd=55.3) used for the first and third layers, a material called S-TiM27 (nd=1.6398 and vd=34.5) used for the second and fourth layers, the grating thicknesses d1 and d2 set at 8 μm (d1=d2=8 μm), and the grating pitch P set at 40 μm. In this case, the diffraction efficiency for the second-order diffraction light saliently increases at angles of θ<−7° or thereabout, and the diffraction efficiency for the zero-order diffraction light saliently increases on the positive (+) side of an angle of θ=−5° or thereabout. This causes a conspicuous flare light component, which is hardly desirable for image forming performance. In the case of this example, the value of d/P is 1/5.

Figure 17A:
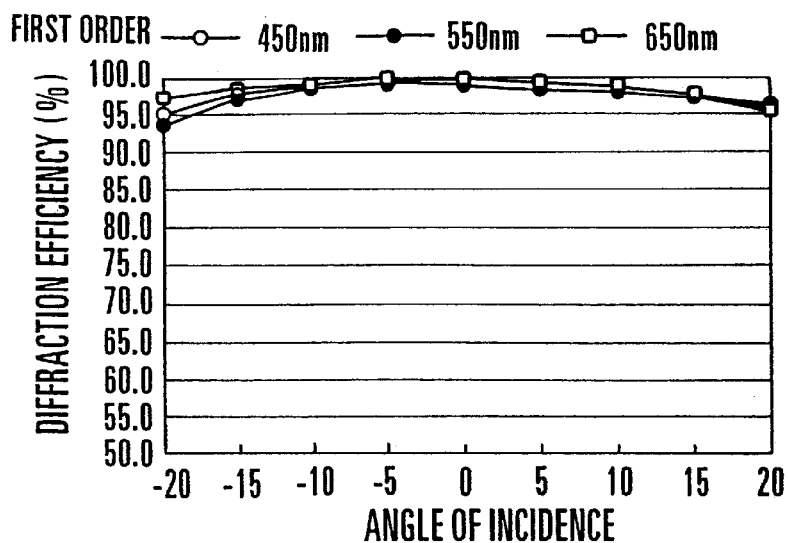
FIGS. 17A to 17C show the diffraction efficiency of a diffractive optical element (different from that of FIGS. 7A through 7C and 16A through 16C) according to the first embodiment of the invention.
Figure 17B:
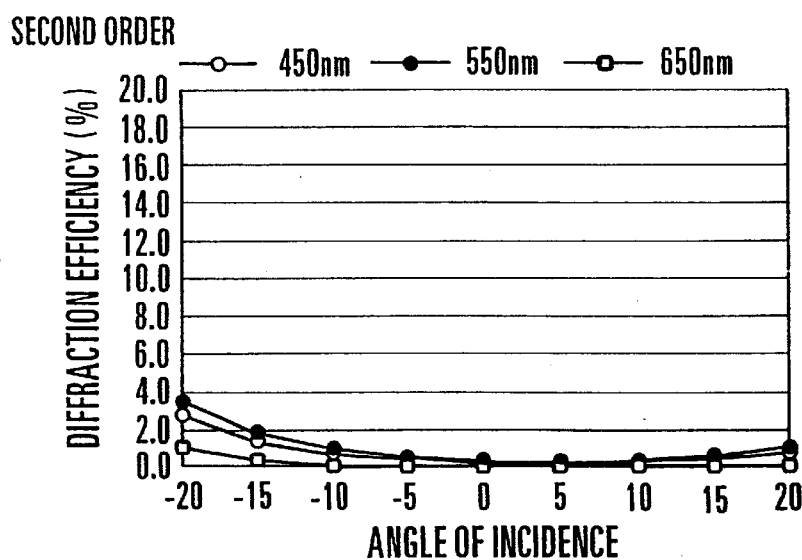
Figure 17C:
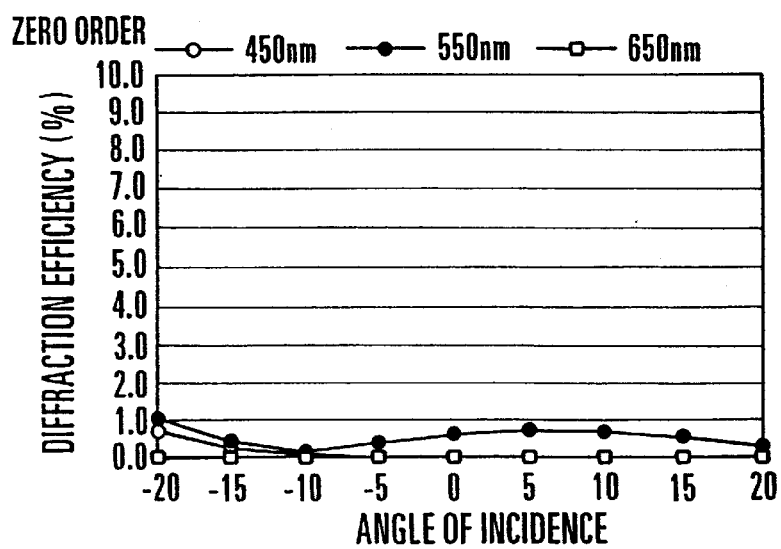
Figure 18A:
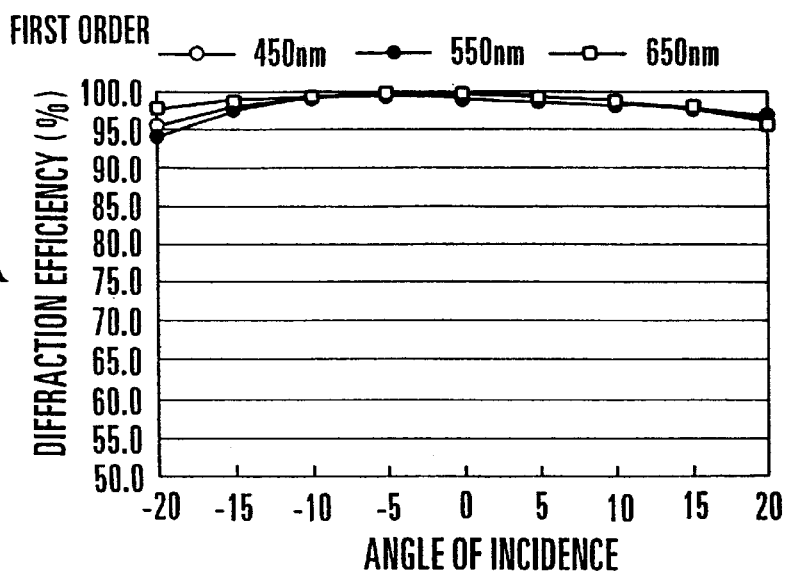
FIGS. 18A to 18C show the diffraction efficiency of a diffractive optical element (different from that of FIGS. 7A through 7C, 16A through 16C, and 17A through 17C) according to the first embodiment of the invention.
Figure 18B:
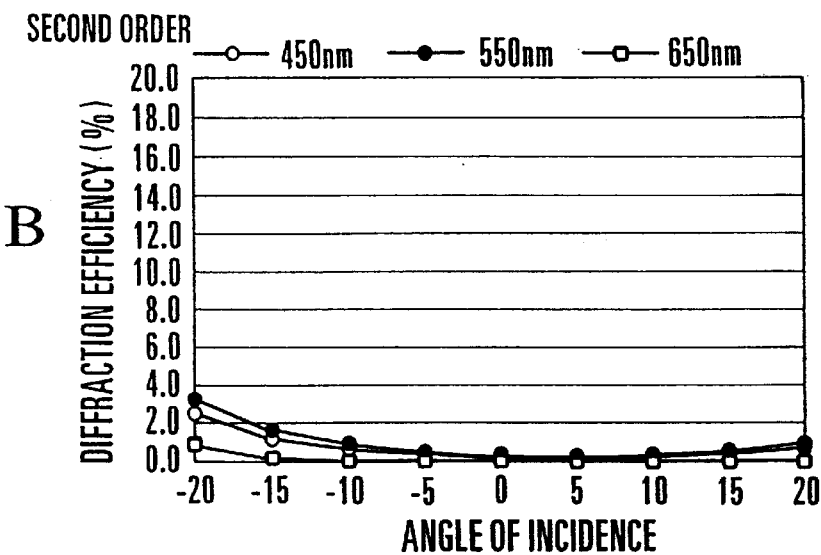
Figure 18C:
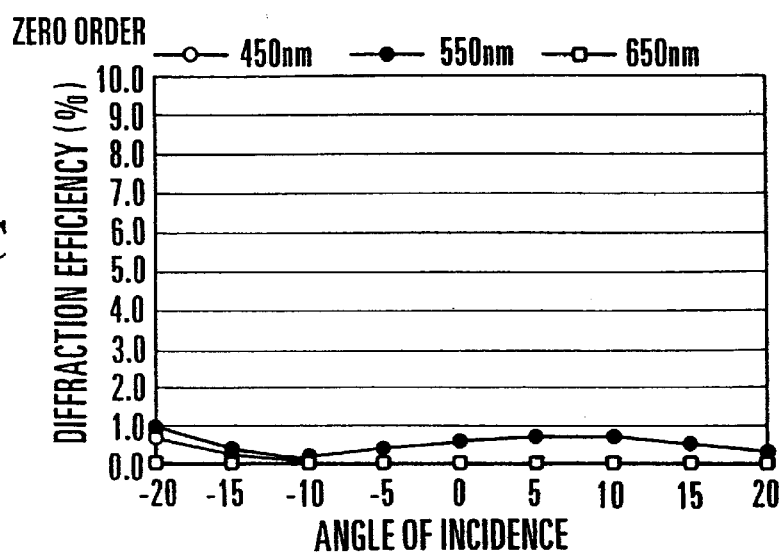

FIGS. 17A, 17B and 17C show, as another example, the incident-angle dependency of the diffraction efficiency obtained by the same structural arrangement, with materials of two kinds, i.e., a material of nd=1.632 and vd=63.8 and a material of nd=1.484 and vd=15.1 used for the layers, the grating thicknesses d1 and d2 set at 2 μm, and the grating pitch P set at 40 μm. FIGS. 18A, 18B and 18C show, as a further example, the incident-angle dependency of the diffraction efficiency of the same structural arrangement, with materials of two kinds, i.e., a material of nd=1.632 and vd=63.8 and a material of nd=1.558 and vd=23.0 used for the layers, the grating thicknesses d1 and d2 set at 4 μm, and the grating pitch P set at 80 μm. In these two examples, the diffraction efficiency for both the diffraction light of the second and zero orders is sufficiently low within a range of incident angles of θ=±20°. It is, therefore, apparent that the adverse effect of flare light is suppressed to a low level. The value of d/P is 1/20 in each of these cases.

As apparent from these examples, a diffractive optical element of the laminated structure having diffraction gratings slanting in the same direction in a grating sectional shape is preferably arranged to have the value of d/P less than 1/5.

Figure 5:
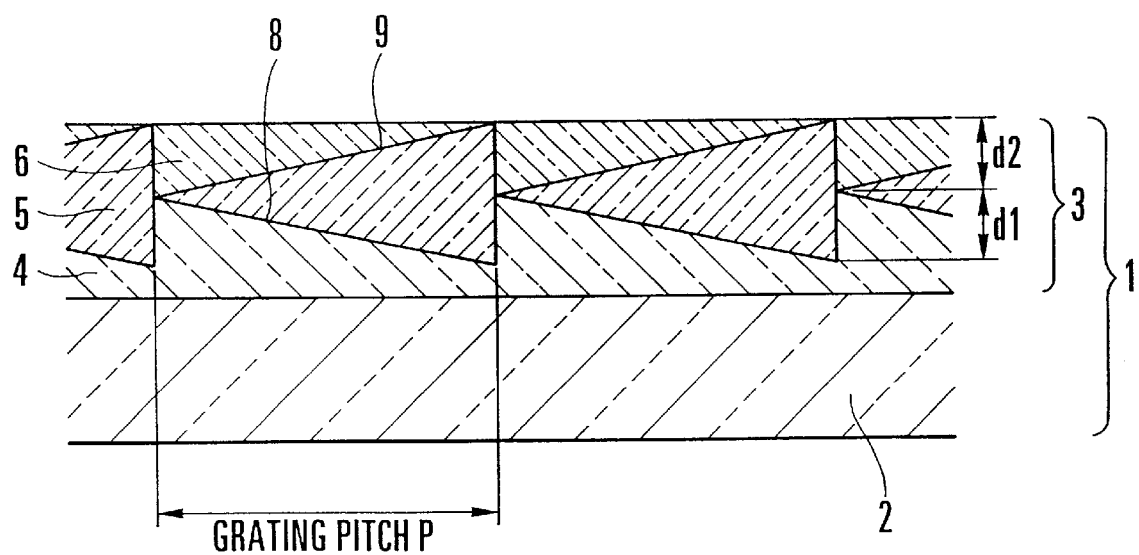
FIG. 5 is a sectional view showing essential parts of a diffractive optical element according to a second embodiment of the invention.

FIG. 5 is a sectional view showing essential parts of a diffractive optical element according to a second embodiment of the invention. In the first embodiment described above, the two divided diffraction gratings are arranged to have the same grating direction. In the grating structure of the second embodiment, on the other hand, at least one of a plurality of diffraction gratings is arranged to have a grating direction which differs from the grating direction of the other diffraction gratings.

The diffractive optical element according to the second embodiment of the invention is composed of three layers, i.e., a first layer 4, a second layer 5 and a third layer 6, as shown in FIG. 5. Here, the grating direction of the first diffraction grating surface 8 differs from that of the second diffraction grating surface 9. Although the grating directions of these diffraction gratings differ from each other, the diffraction efficiency of the second embodiment is the same as that of the first embodiment for a perpendicular incident light flux, as the materials with the diffraction grating surface 9 at a boundary thereof are arranged reversely to those of the first embodiment.

The arrangement of the second embodiment is characterized by the thinness of the gratings, so that the workability of the diffractive optical element can be greatly improved. In the case of a diffraction grating having a flat datum plane as shown in FIG. 5, if the absolute values of the grating thicknesses d1 and d2 of the first and third diffraction gratings 4 and 6 are equal to each other, the grating shape of the first layer 4 and that of the third layer 6 are identical with each other. Therefore, the diffractive optical element according to the second embodiment can be manufactured by a manufacturing method as shown in FIGS. 6A to 6D.

Figure 6A:
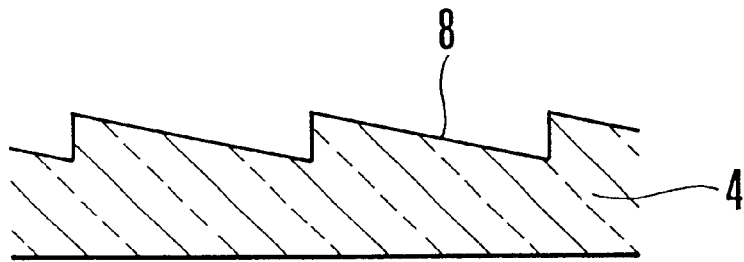
FIGS. 6A to 6D are sectional views showing the method of manufacturing the diffractive optical element according to the second embodiment of the invention.
Figure 6B:
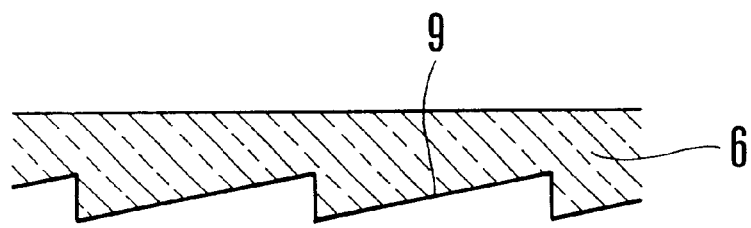
Figure 6C:
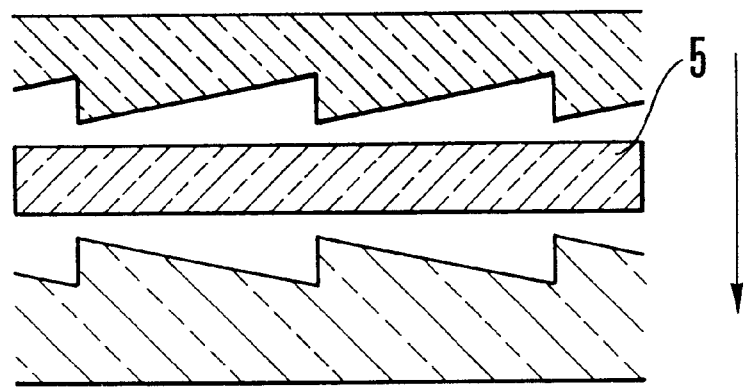
Figure 6D:
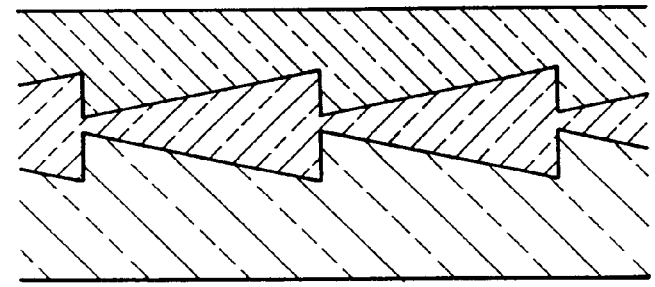

More specifically, the grating part of the first layer 4 and that of the third layer 6 can be formed by molding with one and the same mold, as shown in FIGS. 6A and 6B. Then, the material of the second layer 5 is filled into a space between the two grating parts, as shown in FIG. 6C, so that the diffractive optical element 1 is formed as shown in FIG. 6D. Compared with the diffractive optical element of the first embodiment, that of the second embodiment curtails manufacturing processes as it has a less number of layers by one than the first embodiment.

The embodiments have been described above only for a case where a light flux is perpendicularly incident on the diffraction gratings. However, in cases where a diffractive optical element is used as a part of an image forming optical system, the optical system is rarely arranged to have only a light flux perpendicularly incident on the diffractive optical element. The diffractive optical element is, therefore, used for a range of specific incident angles in general.

Figure 8A:
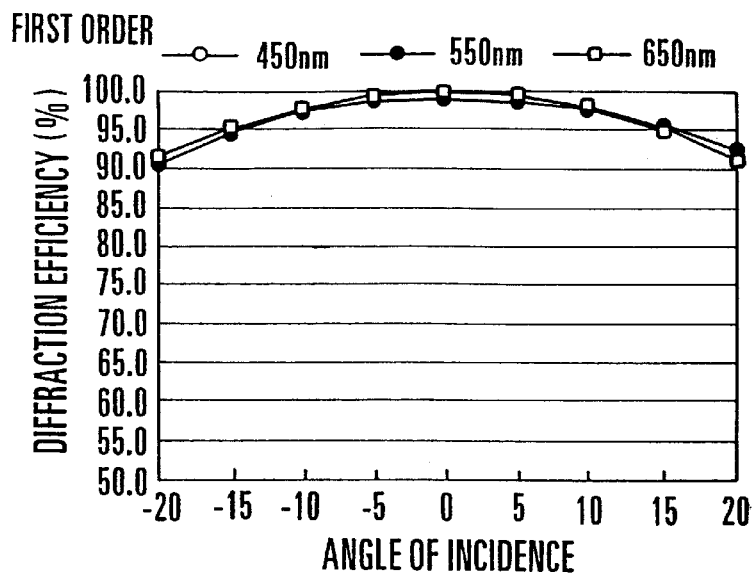
FIGS. 8A to 8C are graphs showing the incident-angle characteristic of the diffractive optical element According to the second embodiment of the invention.
Figure 8B:
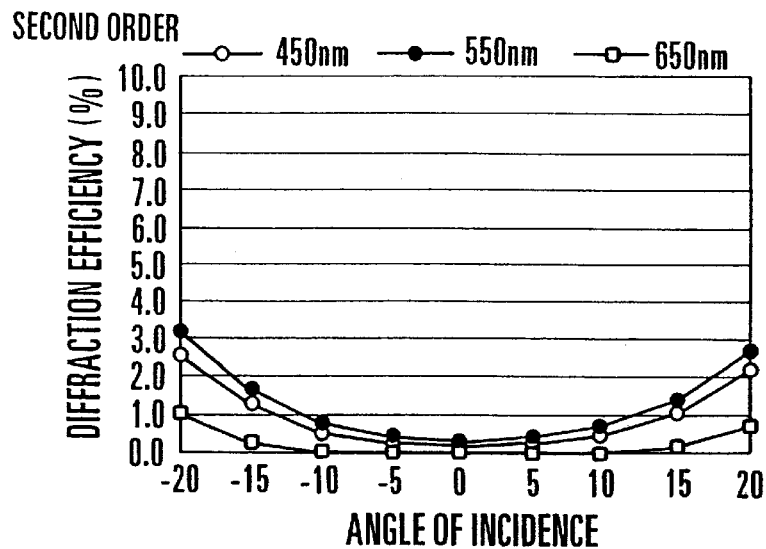
Figure 8C:
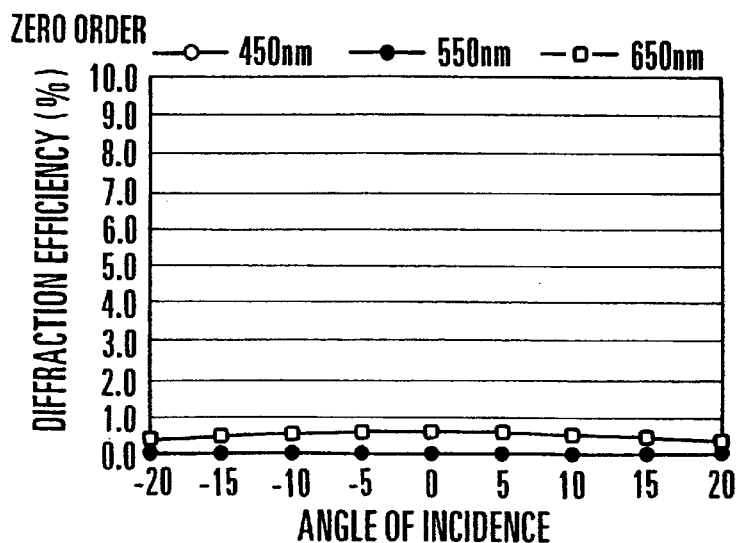

Variations of the diffraction efficiency taking place for different incident angles are next described for the grating structure of the first embodiment shown in FIG. 2 and that of the second embodiment shown in FIG. 5. FIGS. 7A, 7B and 7C show the relationship between the diffraction efficiency and the incident angle in the first embodiment. FIGS. 8A, 8B and 8C show the relationship between the diffraction efficiency and the incident angle in the second embodiment.

Here, FIGS. 7A and 8A show the variations of the diffraction efficiency in relation to the incident angle of diffraction light of the first order, FIGS. 7B and 8B show the variations of the diffraction efficiency in relation to the incident angle of diffraction light of the second order, and FIGS. 7C and 8C show the variations of the diffraction efficiency in relation to the incident angle of diffraction light of the zero order. In this instance, the incident light flux is within a plane defined by the grating pitch direction of the diffraction grating and the normal line of the diffraction grating surface. In other words, the diffraction light flux is assumed to be within one plane. As for the sign of incident angle, the direction of e shown in FIG. 2 is assumed to indicate positive values. Further, a total grating thickness is a depth measuring 8 μm, and the grating pitch is 40 μm.

As apparent from these figures, the variations of the diffraction efficiency at negative (−) incident angles in the grating structure of the second embodiment are suppressed to a greater degree than in the grating structure of the first embodiment. For example, in order to suppress the diffraction efficiency for diffraction orders other than the design order to 3% or less, the incident angle e must be within a range of $-15° \leq \theta \leq 20°$ in the case of the first embodiment, whereas the second embodiment allows the incident angle θ to have a wider range of $-20° \leq \theta \leq 20°$.

In actually applying a diffractive lens according to each of the embodiments to actual optical systems, the width of light flux and the grating pitch of the diffractive lens have various values. Therefore, a usable range of angles of view and an allowable diffraction efficiency for the design diffraction order must be decided in combination most apposite to every case.

As described above, an advantage of the grating structure of the second embodiment lies in that the variations of the diffraction efficiency for variations in incident angle can be suppressed. Another advantage of the second embodiment lies in that, in a case where the shape of a datum plane is a flat surface, the manufacturing processes for the diffractive optical element can be shortened.

Figure 9:
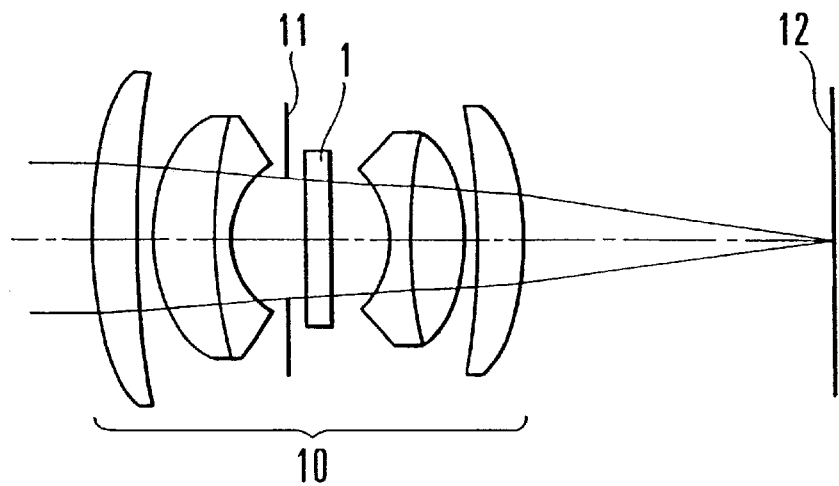
FIG. 9 is a schematic illustration showing an optical system having a diffractive optical element according to a third embodiment of the invention.

FIG. 9 is a sectional view schematically showing an optical system having the diffractive optical element of the invention according to a third embodiment thereof. The optical system is an image forming optical system of a camera or the like. Referring to FIG. 9, a photo-taking lens 10 includes therein a diaphragm 11 and the diffractive optical element 1. An image forming plane 12 represents a film or a CCD.

The wavelength dependency of the diffraction efficiency of the third embodiment is greatly improved by the use of the diffractive optical element 1 which is of the laminated structure. Therefore, the photo-taking lens does not have much flare, has a high resolution at low frequencies and thus has a high performance. Since the diffractive optical element can be simply formed in accordance with the invention, the photo-taking lens can be manufactured by mass production at low cost.

In the third embodiment shown in FIG. 9, the diffractive optical element 1 is disposed on the flat glass surface near the diaphragm 11. However, the disposition of the diffractive optical element is not limited to such position and may be on the curved surface of a lens. Further, a plurality of diffractive optical elements may be disposed within the photo-taking lens.

While the invention is applied to the photo-taking lens of a camera in the case of the third embodiment, the invention is not limited to it. The same advantages can be attained by applying the invention to a photo-taking lens of a video camera, an image scanner of a business machine, a reader lens of a digital copying machine, etc.

Figure 10:
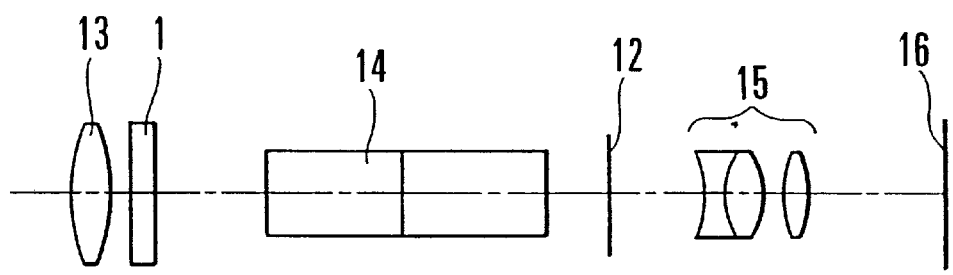
FIG. 10 is a schematic illustration showing an optical system having a diffractive optical element according to a fourth embodiment of the invention.

FIG. 10 is a sectional view schematically showing an optical system having the diffractive optical element of the invention according to a fourth embodiment thereof. The optical system is an observation optical system of a binocular or the like. The optical system shown in FIG. 10 includes an objective lens 13, an image inverting prism 14 for erecting an image, an eyepiece lens 15, and an evaluation plane (pupil plane) 16.

In FIG. 10, reference numeral 1 denotes the diffractive optical element, which is used for the purpose of correcting chromatic aberration of the objective lens 13 appearing on an image forming plane 12.

The wavelength dependency of the diffraction efficiency of the fourth embodiment is greatly improved by the use of the diffractive optical element 1 of the laminated structure. The objective lens, therefore, does not have much flare, has a high resolution at low frequencies and thus has a high performance. Further, since the diffractive optical element according to the invention can be simply formed, the observation optical system can be manufactured by mass production at low cost.

In the fourth embodiment, the diffractive optical element 1 is formed at the objective lens 13. However, the same advantageous effects can be attained with the diffractive optical element 1 disposed either on the surface of the prism 14 or within the eyepiece lens 15. Since the effect of abating chromatic aberration can be attained solely through the objective lens 13 with the diffractive optical element 1 disposed on the object side of the image forming plane 12, the diffractive optical element 1 is preferably disposed at least on the side of the objective lens 13 in the case of an observation optical system.

In the case of the fourth embodiment described above, the invention is applied to a binocular. The arrangement of the fourth embodiment, however, applies not only to it but also to a terrestrial telescope, an astronomical telescope or the like. The same advantages are also attainable by applying the arrangement to an optical viewfinder of a lens-shutter type camera, a video camera or the like.

What is claimed is:

1. A diffractive optical element comprising:
a plurality of diffraction grating surfaces, each of said plurality of diffraction grating surfaces being formed on a boundary surface between layers which differ from each other in dispersion,
wherein the length obtained by combining optical path length differences generated at said plurality of diffraction grating surfaces is the same as the wavelength of light diffracted by said plurality of diffraction grating surfaces, and
wherein, letting a grating height and a grating pitch of a diffraction grating surface be denoted by d (μm) and P (μm), respectively, the following condition is satisfied for each of said plurality of diffraction grating surfaces:

$$d/P < 1/6.$$

2. An optical system comprising:
a lens system; and
a diffractive optical element according to claim 1.

3. A diffractive optical element according to claim 2, wherein said plurality of diffraction grating surfaces include two diffraction grating surfaces whose grating slant directions are opposite to each other.

4. A diffractive optical element according to claim 1, wherein said plurality of diffraction grating surfaces include two diffraction grating surfaces whose grating slant directions are opposite to each other.

5. An optical system comprising:
a diffractive optical element according to claim 1, said diffractive optical element being configured to abate chromatic aberration in said optical system.

6. A diffractive optical element according to claim 1, wherein said plurality of diffraction grating surfaces are formed such that the diffraction efficiency is more than 90% over the whole visible spectrum.

7. A diffractive optical element comprising:
a plurality of diffraction grating surfaces, each of said plurality of diffraction grating surfaces being formed on a boundary surface between layers which differ from each other in dispersion,
wherein the length obtained by combining optical path length differences generated at said plurality of diffraction grating surfaces is the same as the wavelength of light diffracted by said plurality of diffraction grating surfaces, and
wherein, letting a grating height of a diffraction grating surface be denoted by d ($\mu$m), the following condition is satisfied for each of said plurality of diffraction grating surfaces:

$1 < d < 6.$

8. An observation optical system comprising:
a lens system; and
a diffractive optical element according to claim 7, said diffractive optical element operating to have a corrective effect upon chromatic aberration generated in said lens system.

9. An observation optical system according to claim 8, wherein said plurality of diffraction grating surfaces include two diffraction grating surfaces whose grating slant directions are opposite to each other.

10. An optical system comprising:
a lens system; and
a diffractive optical element according to claim 7.

11. An optical system according to claim 10, wherein said plurality of diffraction grating surfaces include two diffraction grating surfaces whose grating slant directions are opposite to each other.

12. A diffractive optical element according to claim 7, wherein said plurality of diffraction grating surfaces include two diffraction grating surfaces whose grating slant directions are opposite to each other.

13. An optical system comprising:
a diffractive optical element according to claim 7, said diffractive optical element being configured to abate chromatic aberration in said optical system.

14. A diffractive optical element according to claim 7, wherein said plurality of diffraction grating surfaces are formed such that the diffraction efficiency is more than 90% over the whole visible spectrum.

15. A diffractive optical element comprising:
a plurality of diffraction grating surfaces, each of said plurality of diffraction grating surfaces being formed on a boundary surface between layers which differ from each other in dispersion,
wherein the length obtained by combining optical path length differences generated at said plurality of diffraction grating surfaces is the same as the wavelength of light diffracted by said plurality of diffraction grating surfaces, and
wherein, letting a grating pitch and a grating height of a diffraction grating surface be denoted by P ($\mu$m) and d ($\mu$m), respectively, the following conditions are satisfied for each of said plurality of diffraction grating surfaces:

$d/P < 1/6;$ and $1 < d < 6.$

16. An optical system comprising:
a lens system; and
a diffractive optical element according to claim 15.

17. An optical system according to claim 16, wherein said plurality of diffraction grating surfaces include two diffraction grating surfaces whose grating slant directions are opposite to each other.

18. A diffractive optical element according to claim 15, wherein said plurality of diffraction grating surfaces include two diffraction grating surfaces whose grating slant directions are opposite to each other.

19. An optical system comprising:
a diffractive optical element according to claim 15, said diffractive optical element being configured to abate chromatic aberration in said optical system.

20. A diffractive optical element according to claim 15, wherein said plurality of diffraction grating surfaces include a first diffraction grating surface and a second diffraction grating surface having the same grating height.

21. A diffractive optical element according to claim 15, wherein said plurality of diffraction grating surfaces include a first diffraction grating surface and a second diffraction grating surface having different grating heights.

22. A diffractive optical element according to claim 15, wherein said diffractive optical element is disposed on a curved surface of a lens.

23. A diffractive optical element according to claim 15, wherein said diffractive optical element comprises a first layer, a second layer, a third layer, and a fourth layer,
wherein a first diffraction grating surface of said plurality of diffraction grating surfaces is formed between the first layer and the second layer,
wherein a second diffraction grating surface of said plurality of diffraction grating surfaces is formed between the third layer and the fourth layer,
wherein the first layer and the third layer are made of a material having a first dispersion, and
wherein the second layer and the fourth layer are made of a material having a second dispersion different from the first dispersion.

24. A diffractive optical element according to claim 23, further comprising a base plate,
wherein a lamination plate comprising the first through fourth layers in order is disposed on a surface of the base plate.

25. A diffractive optical element according to claim 23, wherein the first and second diffraction grating surfaces are blazed diffraction grating surfaces,
wherein the grating heights of the first and second diffraction grating surfaces are the same, and
wherein the first and second diffraction grating surfaces slant in the same direction.

26. A diffractive optical element according to claim 23, wherein for each of the first diffraction grating surface and the second diffraction grating surface, d=5.95 μm and P=59.5 μm.

27. A diffractive optical element according to claim 23, wherein for each of the first diffraction grating surface and the second diffraction grating surface, d=2 μm and P=40 μm.

28. A diffractive optical element according to claim 23, wherein for each of the first diffraction grating surface and the second diffraction grating surface, d=4 μm and P=80 μm.

29. A diffractive optical element according to claim 15, wherein said diffractive optical element comprises a first layer, a second layer, and a third layer,
wherein a first diffraction grating surface of said plurality of diffraction grating surfaces is formed between the first layer and the second layer,
wherein a second diffraction grating surface of said plurality of diffraction grating surfaces is formed between the second layer and the third layer,
wherein the first layer and the third layer are made of a material having a first dispersion,
wherein the second layer is made of a material having a second dispersion different from the first dispersion, and
wherein the first and second diffraction grating surfaces are blazed diffraction grating surfaces slanting in opposite directions and having the same grating height.

30. A diffractive optical element according to claim 15, wherein said plurality of diffraction grating surfaces are formed such that the diffraction efficiency is more than 90% over the whole visible spectrum.

31. A diffractive optical element comprising:
a plurality of diffraction grating surfaces, each of said plurality of diffraction grating surfaces being formed on a boundary surface between layers which differ from each other in dispersion, and a grating pitch of each of the diffractive grating surfaces being changed within the surface,
wherein the length obtained by combining optical path length differences generated at said plurality of diffraction grating surfaces is the same as the wavelength of light diffracted by said plurality of diffraction grating surfaces, and
wherein, letting a grating height and a minimum grating pitch of a the diffraction grating surface be denoted by d (μm) and P (μm), respectively, the following condition is satisfied for each of said plurality of diffraction grating surfaces:

$d/P<1/6.$

32. An optical system comprising:
a lens system; and
a diffractive optical element according to claim 31.

33. A diffractive optical element according to claim 32, wherein said plurality of diffraction grating surfaces include two diffraction grating surfaces whose grating slant directions are opposite to each other.

34. A photo-taking optical system comprising:
a lens system; and
a diffractive optical element according to claim 31, said diffractive optical element operating to have a corrective effect upon chromatic aberration generated in said lens system.

35. A photo-taking optical system according to claim 34, wherein said plurality of diffraction grating surfaces include two diffraction grating surfaces whose grating slant directions are opposite to each other.

36. A diffractive optical element according to claim 31, wherein said plurality of diffraction grating surfaces include two diffraction grating surfaces whose grating slant directions are opposite to each other.

37. An optical system comprising:
a diffractive optical element according to claim 31, said diffractive optical element being configured to abate chromatic aberration in said optical system.

38. A diffractive optical element according to claim 31, wherein said plurality of diffraction grating surfaces are formed such that the diffraction efficiency is more than 90% over the whole visible spectrum.

39. A diffraction optical element comprising:
a plurality of diffraction grating surfaces, each of said plurality of diffraction grating surfaces being formed on a boundary surface between layers which differ from each other in dispersion, and a grating pitch of each of the diffractive grating surfaces being changed within the surface,
wherein the length obtained by combining optical path length differences generated at said plurality of diffraction grating surfaces is the same as the wavelength of light diffracted by said plurality of diffraction grating surfaces, and
wherein, letting a grating height of a diffraction grating surface be denoted by d (μm) the following condition is satisfied for each of said plurality of diffraction grating surfaces:

$1<d<6.$

40. An optical system comprising:
a lens system; and
a diffractive optical element according to claim 39.

41. An optical system according to claim 40, wherein said plurality of diffraction grating surfaces include two diffraction grating surfaces of whose grating slant directions are opposite to each other.

42. A photo-taking optical system comprising:
a lens system; and
a diffractive optical element according to claim 39, said diffractive optical element operating to have a corrective effect upon chromatic aberration generated in said lens system.

43. A photo-taking optical system according to claim 42, wherein said plurality of diffraction grating surfaces include two diffraction grating surfaces whose grating slant directions are opposite to each other.

44. An observation optical system comprising:
a lens system; and
a diffractive optical element according to claim 39, said diffractive optical element operating to have a corrective effect upon chromatic aberration generated in said lens system.

45. An observation optical system according to claim 44, wherein said plurality of diffraction grating surfaces include two diffraction grating surfaces whose grating slant directions are opposite to each other.

46. A diffractive optical element according to claim 39, wherein said plurality of diffraction grating surfaces include two diffraction grating surfaces whose grating slant directions are opposite to each other.

47. An optical system comprising:
a diffractive optical element according to claim 39, said diffractive optical element being configured to abate chromatic aberration in said optical system.

48. A diffractive optical element according to claim 39, wherein said plurality of diffraction grating surfaces are formed such that the diffraction efficiency is more than 90% over the whole visible spectrum.

49. A diffractive optical element comprising:
   a plurality of diffraction grating surfaces, each of said plurality of diffraction grating surfaces being formed on a boundary surface between layers which differ from each other in dispersion, and a grating pitch of each of the diffractive grating surfaces being changed within the surface,
   wherein the length obtained by combining optical path length differences generated at said plurality of diffraction grating surfaces is the same as the wavelength of light diffracted by said plurality of diffraction grating surfaces, and
   wherein, letting a grating height and a minimum grating pitch of a diffraction grating surface be denoted by d ($\mu$m) and P ($\mu$m), respectively, the following conditions are satisfied for each of said plurality of diffraction grating surfaces:

$d/P < 1/6$ $1 < d < 6$.

50. An optical system comprising:
   a lens system; and
   a diffractive optical element according to claim 49.

51. An optical system according to claim 50, wherein said plurality of diffraction grating surfaces include two diffraction grating surfaces whose grating slant directions are opposite to each other.

52. A photo-taking optical system comprising:
   a lens system; and
   a diffractive optical element according to claim 49, said diffractive optical element operating to have a corrective effect upon chromatic aberration generated in said lens system.

53. A photo-taking optical system according to claim 52, wherein said plurality of diffraction grating surfaces include two diffraction grating surfaces whose grating slant directions are opposite to each other.

54. An observation optical system comprising:
   a lens system; and
   a diffractive optical element according to claim 49, said diffractive optical element operating to have a corrective effect upon chromatic aberration generated in said lens system.

55. An observation optical system according to claim 54, wherein said plurality of diffraction grating surfaces include two diffraction grating surfaces whose grating slant directions are opposite to each other.

56. A diffractive optical element according to claim 49, wherein said plurality of diffraction grating surfaces include two diffraction grating surfaces whose grating slant directions are opposite to each other.

57. An optical system comprising:
   a diffractive optical element according to claim 49, said diffractive optical element being configured to abate chromatic aberration in said optical system.

58. A diffractive optical element according to claim 49, wherein said plurality of diffraction grating surfaces are formed such that the diffraction efficiency is more than 90% over the whole visible spectrum.

* * * * *